(12) United States Patent
Peller et al.

(10) Patent No.: US 6,934,775 B2
(45) Date of Patent: Aug. 23, 2005

(54) OPERATING METHOD FOR A DATA BUS FOR SEVERAL USERS WITH FLEXIBLE TIMED ACCESS

(75) Inventors: Martin Peller, Munich (DE); Josef Berwanger, Poing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 370 days.

(21) Appl. No.: 10/114,316

(22) Filed: Apr. 3, 2002

(65) Prior Publication Data

US 2002/0161952 A1 Oct. 31, 2002

Related U.S. Application Data

(63) Continuation of application No. PCT/EP00/08788, filed on Sep. 8, 2000.

(30) Foreign Application Priority Data

Oct. 4, 1999 (DE) .......................................... 199 47 657

(51) Int. Cl.[7] .............................................. G06F 3/00
(52) U.S. Cl. ............................. 710/36; 710/59; 710/60; 710/309
(58) Field of Search ............................. 710/36, 58, 59, 710/60, 61, 309, 53, 33

(56) References Cited

U.S. PATENT DOCUMENTS 4,761,799 A * 8/1988 Arragon ..................... 375/356
4,785,394 A * 11/1988 Fischer ...................... 710/114
5,161,153 A * 11/1992 Westmore ................... 370/407
6,101,570 A * 8/2000 Neumyer .................... 710/240

FOREIGN PATENT DOCUMENTS

| DE | 3726742 | 2/1989 |
|----|---------|--------|
| DE | 19720401 | 3/1998 |
| WO | 99/46892 | 9/1999 |

OTHER PUBLICATIONS www.dictionary.com-->sequence.*

Christopher Temple, "Avoiding the Babbling–Idiot Failure in a Timed–Triggered Communication System" Annual International Symposium on Fault–Tolerant Computing, US, Los Alamitos, California, Jun. 23, 1998.

* cited by examiner

*Primary Examiner*—Fritz Fleming
*Assistant Examiner*—Alan Chen
(74) *Attorney, Agent, or Firm*—Crowell & Moring LLP

(57) ABSTRACT

The invention relates to an operating method for a data bus for several parties with flexible, timed access. According to the method, the parties are synchronized, the bus messages are sent from the parties in a hierarchical sequence and are sent at least in part, only if necessary. A logic element is provided between the parties and the data bus which only gives bus access to each party when said party is allowed to send and for the duration of the send operation.

3 Claims, 1 Drawing Sheet

OPERATING METHOD FOR A DATA BUS FOR SEVERAL USERS WITH FLEXIBLE TIMED ACCESS

CROSS-REFERENCE TO RELATED APPLICATIONS

This application is a continuation of PCT Application No. PCT/EP00/08788 filed Sep. 8, 2000.

This application is related to copending applications entitled "Data B is For Several Users", U.S. Ser. No. 10/114,325; "Operating Method for Two Data Buses", U.S. Ser. No. 10/114,317; and "Operating Method for a Data Bus", U.S. Ser. No. 10/114,331, filed on even date herewith.

BACKGROUND AND SUMMARY OF THE INVENTION

The invention relates to an operating method for a data bus for several users with flexible timed access. A method of this type is known from International Patent document WO 99/46892A. In the case of such a data bus, a defect may occur in a user, such that the defective user sends data on the bus more frequently than permitted, at unacceptable points in time or continuously and thereby blocks the bus completely and, as a result, may interfere with the data traffic or completely stop the data traffic.

In the case of data buses which operate according to the TDMA (Time Division Multiplex Access) method, as they are known in principle from U.S. Pat. No. 4,866,606 A, so-called bus guardians can be used. These devices have their own clock pulse supply and know the starting and ending points-in-time of the transmission slot of the user to be monitored. As a result, it is possible, by means of the bus guardian, to clear the transmission line of the user only between the starting and ending point in time of the permitted transmission slot and not to allow bus access for the remainder of the time. Thus, in the event of a defect in the user, the interference can only have an effect on the entire bus within the transmission slot of the defective user and not in the remainder of the time (see "Specification of the TTP/C Protocol", Specification Version 1.0 of Jul. 21, 1999, Document Edition 1.0 of Jul. 21, 1999, Page 113 and on).

In the case of data buses with a flexible, timed access, such an access control cannot be used because of the actual transmission time of the message of the respective user, which is a function of the use of the data bus by the higher-ranking user. This use cannot be predicted from the start, and the actual transmission time therefore varies even from one cycle to the next.

It is an object of the invention to provide an operating method of the initially mentioned type which, also in the case of a data bus for several users with a flexible, timed access, excludes an interference with the data bus traffic caused by a defective user.

This object is achieved by a data bus for several users with a flexible, timed access, characterized in that the users are synchronized, the bus telegrams are emitted in a hierarchical transmission sequence by the users and at least partially only as required and, between the users and the data bus, a switching element is situated which releases the bus access for the respective user only when and as long as the user is permitted to transmit.

The synchronization can take place, for example, by means of a clock pulse generator which emits a synchronization pulse at regular time intervals. In addition or as an alternative, the synchronization can also take place by means of a defined, preferably the highest-priority, communication which is also emitted at regular time intervals.

A special characteristic of the data bus on which the invention is based is the fact that a user will have access to the data bus only when the user actually wants to transmit and is authorized to transmit. If the user does not want to send a message during a cycle, the user, as the transmitter, remains separated from the data bus. A continuously transmitting user, as a rule, has no transmission authorization. The user therefore has no access at all to the data bus. In contrast to the bus guardian in the case of the TDMA bus, the user cannot interfere with the data bus traffic at all.

As known per se, the switching element can have a time control (timing) which is independent of the users. As a result, the point-in-time for the starting and ending of the transmission authorization of the individual user can be independently computed, and an access to the bus at an unacceptable point-in-time, which would be caused by a defect of the clock pulse generator which would have an adverse effect on the timing for the bus operation, can be excluded.

Another advantageous further development of the invention consists of the fact that the switching element has adaptation elements by which the control of the bus access time can be varied beyond the actual transmission time. As a result, for example, construction-specific propagation time delays within the data bus can be taken into account. Details in this respect are contained in German Patent document DE 19810293 A as well as in the following description of an embodiment.

A further development consists of the fact that the variation of the bus access time depends on the function of the user.

Other objects, advantages and novel features of the present invention will become apparent from the following detailed description of the invention when considered in conjunction with the accompanying drawings.

DETAILED DESCRIPTION OF THE DRAWINGS

Figure 1:
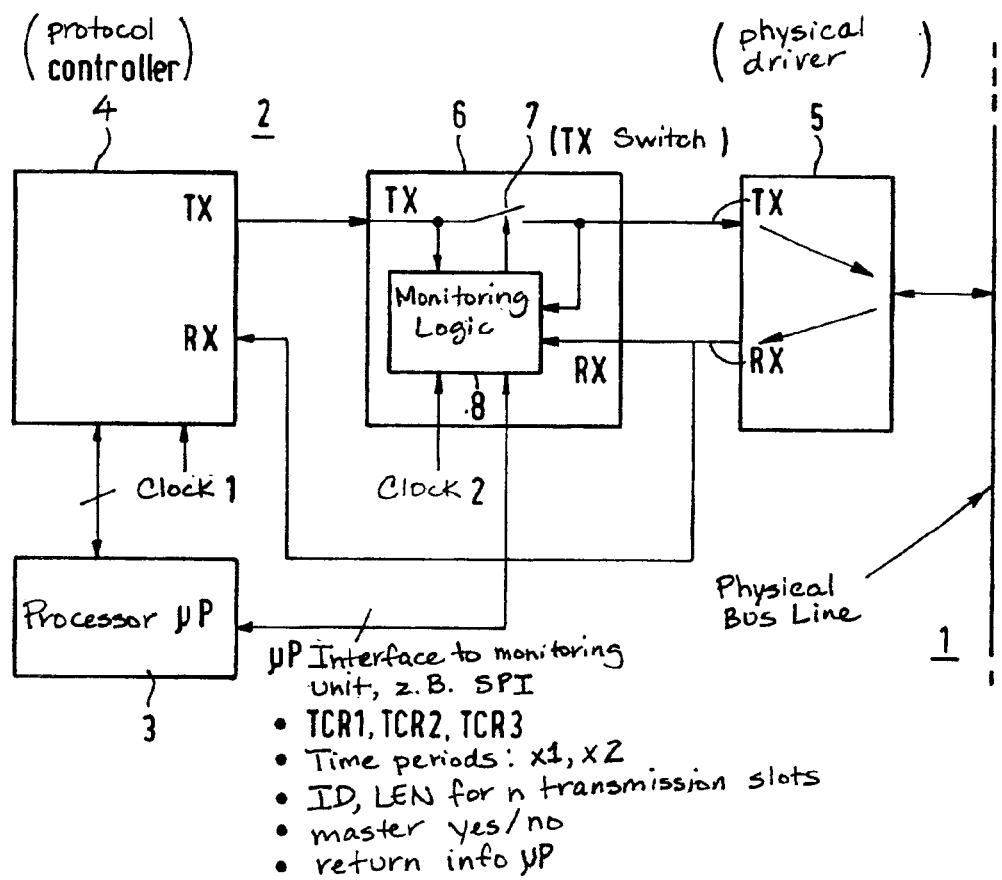
FIG. 1 is a connection diagram of a data bus according to the invention.

The connection diagram illustrated in the single figure is a schematic and cutout-type view of the construction of a data bus according to the invention. The data bus 1, which in principle is known, for example, from German Patent document DE 19720401 A and has a flexible, timed access, contains users 2 (which essentially consist of a microprocessor 3, a protocol controller 4 and a driver 5). Each of these users 2 (only one of which is shown) has a transmission line Tx and a reception line Rx which extend to the data bus 1. A central clock pulse generator (not shown) defines the beginning of a clock cycle (clock 1), for example, by the emission of a synchronization pulse.

According to the invention, a switching element 6 is provided which, as illustrated, is connected between the protocol controller 4 and the driver 5. It is connected to the transmission and reception line Tx and Rx and is directly connected with the microprocessor 3, for example, by way of a serial interface. The switching element 6 also has a separate clock pulse generator (not shown) whose clock frequency (clock 2), when operating properly, is at least approximately identical with that of the central clock pulse generator.

The separate clock pulse generator is synchronized with respect to the central clock pulse generator, after the recognition of the synchronization pulse on the Tx or Rx line of the data bus at the start of the cycle. A slot counter (not shown) is started, which is present in a monitoring logic 8 of the switching element 6. In its basic construction, the slot counter corresponds to the slot counter present in a protocol controller of such a data bus. The slot counter defines the transmission time period (start and end of the transmission) for the emission of the message to be sent by the user. As described, for example, in International Patent document WO 98/09844 A (having U.S. Pat. No. 6,323,764, the specification of which is incorporated by reference herein), the transmission period, with respect to its spacing from the synchronization pulse (=point in time of the initialization), depends on whether and to what extent higher-priority users have transmitted.

For this purpose, the slot counter has a transmission list for a total of n communications. It essentially consists of 2n memory cells in order to define n permitted transmission slots. For each transmission slot, identifiers ID (order of priority of the telegram) and telegram length LEN must be defined (1 memory cell respectively for ID and LEN). The memory cells are described, for example, within the scope of the data bus initialization by way of the serial interface SPI.

So that the slot counter in the switching element operates analogous to the slot counters in all bus users, the Tx and Rx lines of the data bus are monitored (because slot counters have to stop when a message is placed on the data bus.) In addition, the slot counter of the switching element has memory cells for the basic delay time values TCR1, TCR2 and TCR3, which result from the signal propagation times in the data bus for the transmitting and receiving as well as from the access procedure for the minimal pause between two messages adjacent in the hierarchy. Details in this regard are contained in International Patent Document WO 99/46892A, the specification of which is incorporated by reference herein as non-essential matter). There, TCR1/2/3 is called t_wx0 tx/t_wx0_rx/t_wx_delta. These time values can be set from the microprocessor 3 (for example, by way of SPI).

The slot counter in the switching element 6 runs synchronously with the slot counters of all bus users. When this slot counter reaches a value which is stored as the ID in the transmission list of the pertaining user, a switch 7 situated in the Tx line is closed so that the user can send its telegram. The time TCR3 (or t_wx_delta=waiting slot) starts to run with the closing of the switch. Simultaneously, the Tx line is monitored by the switching element 6. When the user transmits a transmission telegram via the Tx line within a possible time window TCR3 for the transmission time start, the switch remains closed until the time has expired, which is defined by the telegram length LEN of the user for this telegram. If no bus access takes place within TCR3, that is, no activity on the transmission line Tx, after TCR3, the switch 7 is opened again because the user has emitted no message.

An access violation of the protocol controller 4 (that is, an access attempt at a point in time which is not provided) can be detected by the switching element 6 because of the then existing transmission activity on the Tx line originating from the protocol controller and can be reported as information to the microprocessor 3. The microprocessor 3 can then, for example, start an error handling procedure at a higher level, in that, for example, the protocol controller is deactivated.

Any error of a user can have an effect on the data bus only in the case of a bus access of the user because the switch 7 is closed only during this time period. When the operating mode of the switching element 6 is selected such that the switch 7 is closed only when an authorized transmission request is actually present, that is, a transmission operation takes place only at the correct point-in-time after a preceding transmission break, interfering transmitters which send a continuous signal can also be completely eliminated.

When the user is a bus master or equivalent master, the switch 7 is also closed from t−x1 to t+x2. In this case, t indicates the ideal synchronization point-in-time which, because of the possible crystal inaccuracies, can actually be shifted forward or backward by x1 or x2 with respect to the ideal point-in-time. The time periods x1 and x2 may also be stored in the monitoring logic 8.

By means of the switching element 6, it is possible to ensure, also in the case of data buses for several user with a flexible, timed access, a "fail silence" behavior of the user when a bus topology is used.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An operating method for a data bus having several users, the data bus having a flexible, timed access, the method comprising the acts of:

synchronizing the several users on the data bus;

sending bus messages in a hierarchical transmission sequence by the several users and at least partially only as required; and granting bus access to a respective user only when and as long as the respective user is permitted to transmit via a switching element situated between the respective user and the data bus, wherein the switching element has a time-control independent of a synchronization timing of the several users.

2. The operating method according to claim 1, wherein the switching element has adaptation elements by which control of bus access time is variable.

3. The operating method according to claim 2, wherein variation of the bus access time depends on a function of a user.

* * * * *